Patented June 9, 1936

2,043,950

UNITED STATES PATENT OFFICE 2,043,950

CATALYTIC OXIDATION OF KETOLS

Martin de Simó and Sumner H. McAllister, Berkeley, Calif., assignors to Shell Development Company, San Francisco, Calif., a corporation of Delaware No Drawing. Application September 22, 1934, Serial No. 745,106

18 Claims. (Cl. 260—134)

This invention relates to the catalytic oxidation of ketone alcohols and is more particularly concerned with reacting primary and/or secondary ketone alcohols with oxygen in the presence of an oxidizing catalyst.

An essential feature of our process comprises effecting the oxidation of a ketol, other than a tertiary carbinol, by causing it to react with oxygen, which may be present in a substantially pure form or in admixture with diluent gases such as nitrogen, etc., as air, or the oxygen may be liberated under the conditions of operation from substances containing oxygen in a combined form.

Suitable ketols for use in our process are those containing such groupings as, for example $$-\overset{|}{\underset{|}{C}}-\overset{O}{\underset{}{\overset{\|}{C}}}-\overset{}{\underset{}{C_n}}-\overset{OH}{\underset{H}{\overset{|}{C}}}-$$

wherein the loose bonds may be taken up by hydrogen, alkyl, alkoxy, carboxylic, heterocyclic, aralkyl, aryloxy and/or aralkoxy groups which may or may not be further substituted, and may or may not contain unsaturated bonds. The loose bonds, other than that on the carbinol group may be further taken up by—OH and/or =O radicals. "$n$" in such a characteristic groupings may be zero or an integer. When "$n$" is zero the carbinol group will be directly attached to the carbonyl group and the grouping will become $$-\overset{|}{\underset{|}{C}}-\overset{O}{\underset{}{\overset{\|}{C}}}-\overset{OH}{\underset{H}{\overset{|}{C}}}-$$

Typical ketols which may be used in our process are, for example, acetol $$CH_3-\overset{O}{\overset{\|}{C}}-CH_2OH$$

and its homologues such as ethyl ketol $$C_2H_5-\overset{O}{\overset{\|}{C}}-CH_2OH$$

propyl ketol $$C_3H_7-\overset{O}{\overset{\|}{C}}-CH_2OH$$

isopropyl ketol $$(CH_3)_2CH-\overset{O}{\overset{\|}{C}}-CH_2OH$$

and the like, or their isomers such as dimethyl ketol $$CH_3-\overset{O}{\overset{\|}{C}}-CHOH-CH_3$$

methyl ethyl ketol $$CH_3-\overset{O}{\overset{\|}{C}}-CHOH-C_2H_5$$

isopropyl methyl ketol $$(CH_3)_2CH-CHOH-\overset{O}{\overset{\|}{C}}-CH_3$$

and the like. Other contemplated ketols are β-aceto ethyl alcohol $$CH_3-\overset{O}{\overset{\|}{C}}-CH_2-CH_2OH$$

γ-aceto propyl alcohol $$CH_3-\overset{O}{\overset{\|}{C}}-CH_2-CH_2-CH_2OH$$

and their homologues. Examples of suitable polyhydric ketols are dihydroxy acetone $$HOH_2C-\overset{O}{\overset{\|}{C}}-CH_2OH$$

α, γ dihydroxy methyl ethyl ketone $$HOH_2C-\overset{O}{\overset{\|}{C}}-CHOH-CH_3$$

and the like; while polyketonic ketols include hydroxy acetylacetone $$CH_3-\overset{O}{\overset{\|}{C}}-CH_2-\overset{O}{\overset{\|}{C}}-CH_2OH$$

diacetyl carbinol $$CH_3-\overset{O}{\overset{\|}{C}}-CHOH-\overset{O}{\overset{\|}{C}}-CH_3$$

hydroxy diacetyl $$CH_3-\overset{O}{\overset{\|}{C}}-\overset{O}{\overset{\|}{C}}-CH_2OH$$

and the like. Instead of the alkyl compounds above exemplified, the aryl and aralkyl derivatives such as benzyl ketol

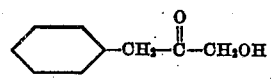

benzyl dimethyl ketol

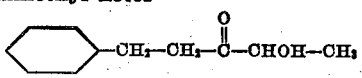

phenyl dihydroxy acetone

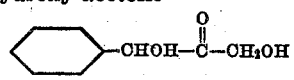

benzoyl methyl ketol

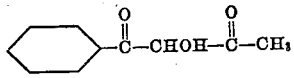

benzoyl carbinol

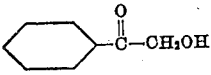

phenyl-acetyl-carbinol

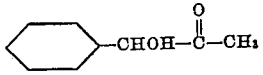

and the like may be used. The cyclic nuclei may be heterocyclic as well as carbocyclic.

We have discovered that when primary and/or secondary ketols are caused to react with oxygen in the presence of a suitable oxidizing catalyst, preferably copper or alloys or oxides thereof, oxidation of the carbinol group or groups is affected very uniformly, undesirable side reactions are repressed and good yields of polyketones and/or ketone aldehydes may be obtained.

The term "oxidation" as used in this specification and the accompanying claims is to be understood as distinguishing our process from dehydrogenation processes which comprise splitting hydrogen atoms from a hydrogen-containing compound whereby molecular hydrogen is obtained as a reaction product. In an oxidation process, as herein defined, the ketol reacts with oxygen forming water and a new carbonyl group. The chief product of our process is thus usually a polycarbonylic compound, although in certain cases a rupture of the molecule may occur to a greater or lesser degree with the formation of simpler monocarbonylic compounds, usually acids.

Our invention may be applied in many ways. The oxidation may, for example, be effected in either the liquid, liquid-vapor or the vapor phase. One convenient method of carrying out our invention is as follows: The ketol to be oxidized is distilled in a stream of oxygen, or free oxygen-containing gas, into a column packed with the desired catalyst. At the top of the column a reflux may be maintained to return substantially all the unchanged ketol to the reaction zone while allowing the more volatile oxidized product to escape and be separately collected. In this method of procedure the oxidation is effected at, or below, the boiling point of the ketol. As a result the reaction, in certain cases, may be relatively slow and comparatively long times of contact may be required for its completion. This may, in some cases, lead to the formation of some higher oxidation products and other side reactions to a certain extent.

An alternative method of procedure in applying our invention comprises effecting the ketol oxidation entirely in the vapor phase. For example, the ketol vapors may be passed in admixture with a definite ratio of air and/or oxygen over an appropriate catalyst heated to the reaction temperature. The exit vapors may be passed into a fractionating column wherein the desired oxidized product is separated and the unreacted ketol recycled through the oxidation zone. The water formed as a by-product of the oxidation reaction may be separated from the product and/or unreacted ketol by any suitable method. In many instances, the neutralized or originally employed ketol need not be free of water.

In this method of operation higher temperatures may be used than in the previously described modification and consequently shorter times of contact are permissible. The practical upper limit of reaction temperature is set, however, by the stability, especially toward pyrolytic decomposition, of the ketol being oxidized as well as of the oxidation product sought, at the existing pressure. The use of temperatures below about 200° C. has been found, in the majority of cases, to be impractical, due to the low rate of oxidation unless impractically long times of contact are provided. We preferably employ therefore, in vapor phase operation temperatures between about 200° C. and about 500° C.

The reaction temperature may be controlled in any convenient manner. As the reaction in our process is predominantly exothermic, means for absorbing heat are usually required; diluent gases admixed with the oxygen may serve this purpose or an inert substance of suitable constant boiling point may be introduced, or resort may be had to other well known methods of control.

Either superatmospheric, atmospheric or subatmospheric pressure may be used. Superatmospheric pressures favor the oxidation reaction but in some cases subatmospheric pressures are advisable in order to avoid decomposition of the ketol. An intermittent, batch or continuous mode of operation may be employed.

In any method of operation the ratio of free oxygen to ketol present in the reaction zone has a marked effect on the course of the reaction. Excess oxygen tends to increase the rate of conversion of the ketol and also promotes the formation of highly oxidized products such as acids and acid anhydrides for example. Where less highly oxidized products, such as diketones and/or ketone aldehydes, are desired, it is preferable, therefore, to carry out our invention with equivalent, or less than equivalent, oxygen ratios.

The catalyst chosen for carrying out the reaction also markedly influences the results obtained. Among the suitable catalysts which may be employed in the solid state, the following may be mentioned as examples: copper oxide, copper, brass, silver, silver-zinc and silver arsenic alloys, gold, gold-silver alloy, platinum, palladium, cobalt, cobalt oxide, nickel, and nickel oxides, vanadium, vanadyl sulfate, silver vanadate, aluminum, cadmium, chromium, chromium oxide, tin, stannous oxide, tungsten, manganous oxide, zinc, zinc oxide, zinc sulfide, etc. Particularly suitable are the elements of the third period of the Periodic Table such as titanium, vanadium, chromium, manganese, iron, cobalt, nickel, copper, zinc and selenium and compounds and mixtures thereof. The most desirable catalyst, in any case, is one which possesses a moderate initial activity and is substantially devoid of the tendency to induce undesirable side reactions such as dehydration, condensation, polymerization, and the like, and possesses a freedom from deterioration as a result of sintering or poisoning. We have found activated copper, copper oxide, and silver to be particularly suitable catalysts for our process.

The particular catalyst chosen may be activated in a variety of well known ways. For example, active metal catalysts may be prepared by either "dry" or "oil" reduction of oxides, hydroxides, carbonates or organic acid salts of the metal with hydrogen at a suitable temperature. The catalysts may be used alone or in admixture with other catalystic metals or compounds or with inert supports or carriers. Due to the exothermic nature of the reaction involved in our process, it is sometimes inadvisable to employ catalysts or carriers of low heat conductivity as the control of the temperature may be rendered difficult thereby. In the majority of cases we prefer, therefore, to use catalysts which are of a more or less compact metallic nature, such as metal wire screen, turnings, granules and the like.

The following examples are illustrative of some specific applications of our invention, but it will be understood, that many other applications and modifications are possible without departing from the spirit thereof.

*Example I*

Dimethyl ketol was distilled under good reflux, in a stream of oxygen, through a column packed with CuO. The reflux of the column was so regulated that the unchanged ketol was returned to the still and at the top of the column only a mixture of substantially pure diacetyl and water was taken off. Excess oxygen over that required for formation of diacetyl was avoided throughout the operation.

After about 60% of the still charge had passed over, the collected product was found to consist of

|  | Percent |
|---|---|
| Diacetyl | 69 |
| Ketol | 4 |
| Water | 27 |

The still bottoms representing about 40% of the original charge were found to be of the following approximate composition:

|  | Percent |
|---|---|
| Dimethyl ketol | about 25 |
| Acetic acid and acetic anhydride | about 50 |
| Ketol acetate and condensations products | about 25 |

The crude diacetyl on fractionation gave a yield of 48% of the pure product based on the dimethyl ketol consumed.

*Example II*

Dimethyl ketol and air in a definite ratio were passed at a definite rate over an activated copper catalyst heated to the reaction temperature. The catalyst was prepared by reducing copper oxide wire with hydrogen at a low temperature. The rate of throughput was about 6 gallons of ketol per hour per cubic foot of catalyst. The results obtained in one pass for several different reaction temperatures and ketol-oxygen ratios are shown in the following tables:

| Reaction temperature °C. | Oxygen (percent of theory) | Ketol reacted percent | Yield of diacetyl (percent of theory) |
|---|---|---|---|
| 256–260 | 100 | 25 | 82 |
| 256–260 | 125 | 64 | 70 |
| 256–260 | 180 | 77 | 43 |
| 305–316 | 100 | 39 | 78 |
| 360–366 | 100 | 48 | 79 |
| 420–430 | 100 | 51 | 74 |

The diacetyl obtained by rectification of the reaction product was in every case exceptionally pure. By recycling the unreacted dimethyl ketol complete conversion was ultimately attained in all cases. It was found to be unnecessary to remove the water formed in the reaction before recycling the unreacted ketol.

It is thus evident that our process provides a commercially available method for producing a wide variety of valuable products, particularly diketones and ketone aldehydes. The diketones are especially useful products, diacetyl, for example, being widely applied as a carrier of the aroma of butter, vinegar, coffee, honey and the like; while other diketones, as well, serve as important intermediates in the synthesis of valuable cyclic compounds. They are valuable starting materials for the preparation of synthetic resins and plastics.

Our process for the preparation of these products offers many advantages over previous methods involving other starting materials, particularly by providing for selective oxidation at the carbinol group or groups which eliminates undesirable oxidation at other parts of the molecule and gives economical yields.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the advantageous results attained. On the other hand, the invention is to be regarded as limited only by the terms of the claims, in which it is our intention to claim all novelty inherent therein as broadly as is possible in view of the prior art.

We claim as our invention:

1. A process for the oxidation of a ketol of the class which consists of primary and secondary ketone alcohols, to a compound containing a carbonyl group in place of a carbinol group, which comprises reacting said ketol with free oxygen in the presence of a solid oxidizing catalyst.

2. A process for the oxidation of a ketol containing a carbonyl group at least once removed from a carbinol group other than a tertiary carbinol group, to a compound containing at least two non-adjacent carbonyl groups, which comprises reacting said ketol with free oxygen in the presence of an oxidizing catalyst.

3. A process for the oxidation of a ketol

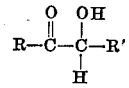

wherein R and R' are members of the group consisting of hydrogen, alkyl, alkoxy, carboxylic, heterocyclic, aralkyl, aryloxy and aralkoxy groups, to a compound containing an oxalyl group, which comprises reacting said ketol with free oxygen in the presence of a solid oxidizing catalyst.

4. A process for the oxidation of a mono carbonylic ketol, other than a tertiary carbinol, to a polycarbonylic compound, which comprises reacting said ketol with free oxygen in the presence of a solid oxidizing catalyst.

5. A process for the oxidation of a primary ketol to a compound containing a carbonyl group in the place of the primary carbinol group, which comprises reacting said ketol with free oxygen in the presence of an oxidizing catalyst.

6. A process for the oxidation of a secondary ketol to a compound containing a carbonyl group in the place of the secondary carbinol group, which comprises reacting said ketol with free oxygen in the presence of a solid oxidizing catalyst.

7. A process for the oxidation of an alkyl ketol, other than a tertiary carbinol, to an alkyl compound containing a carbonyl group in place of a carbinol group, which comprises reacting said alkyl ketol with free oxygen in the presence of a solid oxidizing catalyst.

8. A process for the oxidation of dimethyl ketol to diacetyl which comprises reacting dimethyl ketol with free oxygen in the presence of a solid oxidizing catalyst.

9. A process for the oxidation of ethyl ketol to ethyl glyoxal which comprises reacting ethyl ketol with free oxygen in the presence of an oxidizing catalyst.

10. A process for the oxidation of a ketol containing cyclic nuclei to a compound containing at least one more carbonyl group which comprises reacting said ketol with free oxygen in the presence of an oxidizing catalyst.

11. A process for the oxidation of a ketol, other than a tertiary carbinol, to a compound containing a carbonyl group in place of a carbinol group, which comprises reacting said ketol with free oxygen in the presence of a metal oxidizing catalyst.

12. A process for the oxidation of a ketol, other than a tertiary carbinol, to a compound containing a carbonyl group in place of a carbinol group, which comprises reacting said ketol with free oxygen in the presence of a catalyst containing an element of the third period of the periodic table.

13. A process for the oxidation of a ketol in accordance with claim 12 in which the catalyst contains copper.

14. A process for the oxidation of a ketol in accordance with claim 12 in which the catalyst is copper oxide.

15. A process for the oxidation of a ketol, other than a tertiary carbinol, to a compound containing a carbonyl group in place of a carbinol group, which comprises reacting said ketol in the vapor phase with free oxygen in the presence of an oxidizing catalyst.

16. A process for the oxidation of a ketol in accordance with claim 15 in which the reaction is carried out at a temperature of between about 200° C. and 500° C.

17. A process for the oxidation of a ketol, other than a tertiary carbinol, to a compound containing a carbonyl group in the place of a carbinol group which comprises reacting said ketol with free oxygen in the presence of an oxidizing catalyst at a temperature of about the boiling point of said ketol at the existing pressure.

18. A process for the oxidation of a ketol, other than a tertiary carbinol, to a compound containing a carbonyl group in place of a carbinol group which comprises reacting said ketol with free gaseous oxygen in the presence of a solid oxidizing catalyst.

MARTIN DE SIMÓ.
SUMNER H. McALLISTER.